United States Patent
Birchfield

(10) Patent No.: US 10,429,271 B2
(45) Date of Patent: Oct. 1, 2019

(54) CAMERA TESTING USING REVERSE PROJECTION

(71) Applicant: Microsoft Technology Licensing, LLC, Redmond, WA (US)

(72) Inventor: Stanley T. Birchfield, Sammamish, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

(21) Appl. No.: 15/608,899

(22) Filed: May 30, 2017

(65) Prior Publication Data

US 2018/0003587 A1 Jan. 4, 2018

Related U.S. Application Data

(60) Provisional application No. 62/357,875, filed on Jul. 1, 2016.

(51) Int. Cl.
  G01M 11/02 (2006.01)
  H04N 17/00 (2006.01)
  G01J 1/42 (2006.01)

(52) U.S. Cl.
  CPC ....... G01M 11/0292 (2013.01); G01J 1/4257 (2013.01); G01M 11/0264 (2013.01); H04N 17/002 (2013.01)

(58) Field of Classification Search
  CPC ........... G01M 11/0292; G01M 11/0264; G01J 1/4257; G06T 2207/30168; G06T 5/003;
  (Continued)

(56) References Cited

U.S. PATENT DOCUMENTS 5,051,960 A * 9/1991 Levin ..................... G01V 1/364
                                                    367/24
5,402,224 A * 3/1995 Hirukawa .......... G01M 11/0264
                                                    355/53
(Continued)

FOREIGN PATENT DOCUMENTS

| CN | 101813558 A | 8/2010 |
| EP | 2096483 A1 | 9/2009 |
| JP | 2010237177 A | 10/2010 |

OTHER PUBLICATIONS

"International Search Report and Written Opinion Issued in PCT Application No. PCT/US2017/038956", dated Sep. 8, 2017, 11 Pages.

(Continued)

*Primary Examiner* — Mohamed K Amara
(74) *Attorney, Agent, or Firm* — Alleman Hall Creasman & Tuttle LLP

(57) ABSTRACT

A computer-implemented method for testing a modulation transfer function or spatial frequency response of an imaging system includes, on a computing device, generating a plurality of accumulation cells running along an accumulation line. A boundary delineation divides a first segment of a digital test image captured by the imaging system from a second segment, and the plurality of accumulation cells collectively comprise a one-dimensional accumulation array. For each of the accumulation cells, a projection ray is generated that extends through the accumulation cell and through the digital test image Each accumulation cell is loaded with an accumulated pixel value based on pixel values sampled from each of a plurality of sampling locations along the projection ray. The modulation transfer function or spatial frequency response of the imaging system is derived from the one-dimensional accumulation array.

18 Claims, 7 Drawing Sheets

(58) Field of Classification Search
CPC .... G06T 7/0002; H04N 17/002; H04N 17/04; H04N 9/3191
See application file for complete search history.

(56) References Cited

U.S. PATENT DOCUMENTS

| | | | |
|---|---|---|---|
| 5,818,572 A | 10/1998 | Pappas et al. | |
| 6,130,750 A * | 10/2000 | Ausschnitt | G03F 7/70625 356/401 |
| 6,535,221 B1 * | 3/2003 | Allen | G06T 3/403 345/611 |
| 6,707,937 B1 * | 3/2004 | Sobel | G06T 3/4007 345/589 |
| 6,781,701 B1 * | 8/2004 | Sweetser | G01M 11/0292 356/515 |
| 7,054,032 B2 * | 5/2006 | Kato | H04N 1/4092 358/1.9 |
| 7,130,469 B2 * | 10/2006 | Adachi | G06K 9/6814 382/224 |
| 7,162,100 B1 * | 1/2007 | Gregory | G06K 9/0063 358/1.2 |
| 7,400,352 B1 * | 7/2008 | Luo | H04N 17/002 348/241 |
| 7,499,600 B2 | 3/2009 | Ojanen et al. | |
| 8,249,357 B2 * | 8/2012 | Yitzhaky | G06T 5/003 382/194 |
| 8,368,751 B2 | 2/2013 | Larkin et al. | |
| 8,823,822 B1 * | 9/2014 | Bhakta | G06K 9/036 348/222.1 |
| 9,092,841 B2 * | 7/2015 | Silver | G06T 7/0006 |
| 9,225,977 B2 * | 12/2015 | Lewinnek | H04N 17/002 |
| 9,432,643 B2 * | 8/2016 | Hayashi | G06T 5/003 |
| 2004/0190030 A1 * | 9/2004 | Foster | G06K 15/128 358/1.9 |
| 2005/0254041 A1 * | 11/2005 | Sadoulet | G01M 11/0292 356/124 |
| 2005/0275831 A1 * | 12/2005 | Silver | G06K 9/4609 356/237.1 |
| 2005/0276513 A1 | 12/2005 | Ojanen et al. | |
| 2007/0266287 A1 | 11/2007 | Liu | |
| 2009/0238426 A1 * | 9/2009 | Fear | G06K 9/3216 382/128 |
| 2010/0166286 A1 * | 7/2010 | Sonke | G06T 7/20 382/132 |
| 2012/0155548 A1 * | 6/2012 | Diggins | G06T 7/0002 375/240.24 |
| 2015/0154463 A1 * | 6/2015 | Besiris | G06K 9/325 382/105 |
| 2015/0332451 A1 * | 11/2015 | Amzaleg | G06T 7/001 382/149 |
| 2016/0003946 A1 * | 1/2016 | Gilliland | G01S 17/10 356/5.01 |
| 2017/0285218 A1 * | 10/2017 | Zhang | G01N 23/04 |

OTHER PUBLICATIONS

Reichenbach, et al., "Characterizing Digital Image Acquisition Devices", In Journal of Optical Engineering, Soc. of Photo-Optical Instrumentation, vol. 30, Issue 2, Feb. 1, 1991, pp. 170-177.

Burns, P., "Application of Tatian's Method to Slanted-Edge MTF Measurement", In Proceedings of SPIE-IS&T Electronic Imaging Symposium, vol. 5668, Jan. 17, 2005, 7 pages.

Benbouzid, A. et al., "Estimation of System MTF of EO Satellite by Slanted Edge Method", In Journal of Advances in Sensors, Signals, Visualization, Imaging and Simulation, Sep. 7, 2012, 6 pages.

Wells, J. et al., "Estimation of the two-dimensional presampled modulation transfer function of digital radiography devices using one-dimensional test objects", In Journal of Medical Physics, vol. 39, Issue 10, Oct. 2012, 15 pages.

Wenny, B. et al., "Pre- and Post-Launch Spatial Quality of the Landsat 8 Thermal Infrared Sensor", In Journal of Remote Sensors, vol. 7, Issue 2, Feb. 11, 2015, 19 pages.

Birchfield, S., "Reverse-Projection Method for Measuring Camera MTF", In Journal of Electronic Imaging, Jan. 29, 2017, 8 pages.

Karuppanagounder, et al., "A Median Filter Approach for Ridler Calvard Method in Image Processing", In Proceedings of National Conference on Signal and Image Processing, Feb. 19, 2012, pp. 161-162.

Masaoka, et al., "Modified slanted-edge method and multidirectional modulation transfer function estimation", In Journal of Optics Express, vol. 22, Issue 5, Mar. 10, 2014, pp. 6040-6046.

Perry, Brian, "Algorithm for MTF estimation by histogram modeling of an edge", In Thesis of Rochester Institute of Technology, Oct. 20, 2001, 18 pages.

Williams, et al., "Low-frequency MTF estimation for digital imaging devices using slanted-edge analysis", In Proceedings of SPIE-IS&T Electronic Imaging Symposium, Dec. 19, 2003, 2 pages.

Lashansky, et al., "Edge Response Revisited", In Proceedings of SPIE—Infrared Imaging Systems: Design, Analysis, Modeling, and Testing, May 2008, 10 pages.

Evtikhiev, et al., "Measurement of noises and modulation transfer function of cameras used in optical-digital correlators", In Proceedings of SPIE 8301, Intelligent Robots and Computer Vision, Jan. 23, 2012, 2 pages.

"Segmentation", Retrieved on: May 18, 2016 Available at: http://www.mif.vu.lt/atpazinimas/dip/FIP/fip-Segmenta.html.

Goesele, et al., "Accuracy of 3D range scanners by measurement of the slanted edge modulation transfer function", In Proceedings of Fourth International Conference on 3-D Digital Imaging and Modeling, Oct. 6, 2003, 8 pages.

Sukumar, et al., "Imaging system MTF-modeling with modulation functions", In Proceedings of 34th Annual Conference of IEEE Industrial Electronics, Nov. 10, 2008, pp. 1748-1753.

"ISO 12233", Retrieved on: May 20, 2016 Available at: https://www.iso.org/obp/ui/#iso:std:iso:12233:ed-2:v1:en.

Kerr, Douglas A., "Determining MTF with a Slant Edge Target", Published on: Oct. 13, 2010 Available at: http://dougkerr.net/Pumpkin/articles/MTF_Slant_Edge.pdf.

Burns, Peter D., "Slanted-Edge MTF for Digital Camera and Scanner Analysis", In Proceedings of Image Processing, Image Quality, Image Capture, Systems Conference, Mar. 2000, 4 pages.

Williams, Don, "Benchmarking of the ISO 12233 Slanted-edge Spatial Frequency Response Plug-in", In Proceedings of Image Processing, Image Quality, Image Capture, Systems Conference, Apr. 1998, pp. 133-136.

Roland, Jackson K. M., "A Study of Slanted-Edge MTF Stability and Repeatability", Published on: Feb. 5, 2015 Available at: http://www.imatest.com/wp-content/uploads/2015/02/Slanted-Edge_MTF_Stability_Repeatability.pdf.

* cited by examiner

CAMERA TESTING USING REVERSE PROJECTION

CROSS REFERENCE TO RELATED APPLICATIONS

This application claims priority to U.S. Provisional Patent Application No. 62/357,875, filed Jul. 1, 2016, the entirety of which is hereby incorporated herein by reference.

BACKGROUND

Imaging systems such as cameras have a variety of properties that dictate their suitability for different uses. One such property is the modulation transfer function (MTF) of the imaging system, which generally indicates how well an imaging system can successfully reproduce contrast from a real-world scene in a digital image. MTF is also referred to in some settings as the spatial frequency response (SFR) of an imaging system.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

A computer-implemented method for testing a modulation transfer function or spatial frequency response of an imaging system includes, on a computing device, generating a plurality of accumulation cells running along an accumulation line. A boundary delineation divides a first segment of a digital test image captured by the imaging system from a second segment, and the plurality of accumulation cells collectively comprise a one-dimensional accumulation array. For each of the accumulation cells, a projection ray is generated that extends through the accumulation cell and through the digital test image. Each accumulation cell is loaded with an accumulated pixel value based on pixel values sampled from each of a plurality of sampling locations along the projection ray. The modulation transfer function or spatial frequency response of the imaging system is derived from the one-dimensional accumulation array.

DETAILED DESCRIPTION

As indicated above, the modulation transfer function (MTF) of an imaging system can determine the suitability of the imaging system for use in different scenarios. Accordingly, it is desirable that the MTF of an imaging system be testable in a manner that yields consistent, reproducible, and usable results. Existing solutions for testing the MTF of an imaging system generally rely on a technique referred to herein as "forward projection," in which pixel values from a region of interest (generally focusing on the edge of a slanted rectangle) are projected into a horizontally-oriented array of bins. However, such techniques are often sensitive to the angle of the slanted rectangle, as well as the number of pixels in the region of interest. Accordingly, testing of the same imaging system in similar situations can yield inconsistent MTF results, limiting the usefulness of MTF-testing techniques that rely on forward projection.

Accordingly, the present disclosure is directed to testing the MTF of an imaging system using "reverse projection." According to this technique, a region of interest is first identified in a digital test image. The region of interest is then sampled at each of a series of sampling locations defined along a set of projection rays. Each projection ray extends through the region of interest, and intersects accumulation cells of a one-dimensional accumulation array. Each accumulation cell of the array is then loaded with an accumulated pixel value that is based on pixel values sampled from the region of interest at each of the series of sampling locations, and the MTF of the imaging system is derived from the accumulated pixel values in the array. Testing the MTF of an imaging system in this manner yields more consistent and reproducible results, and is less affected by the slant formed by the edge of the slanted rectangle or the number of pixels in the region of interest.

Figure 1:
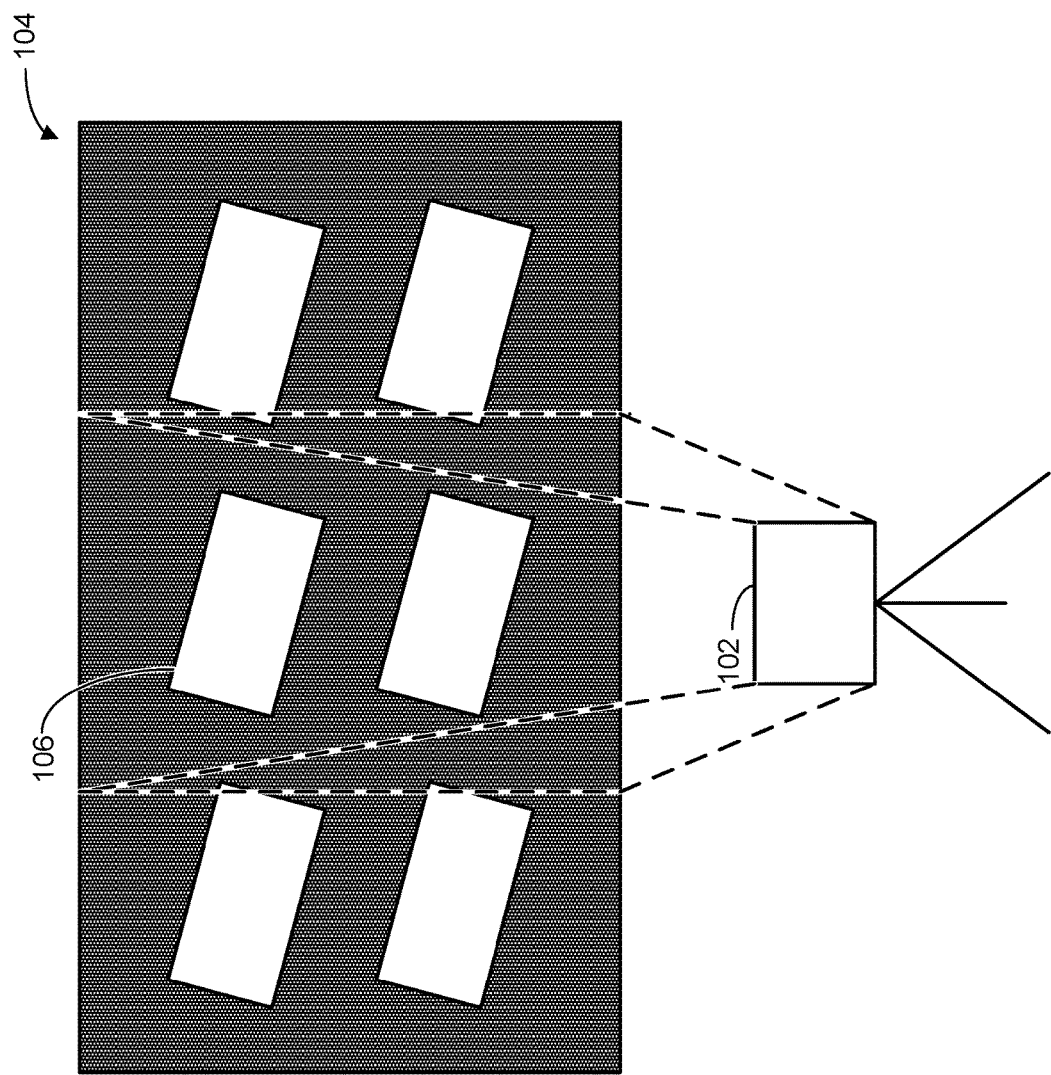
FIG. 1 schematically shows an example MTF testing environment.

FIG. 1 schematically shows an example environment 100 for testing the MTF of an imaging system 102. In some examples, imaging system 102 may take the form of a camera, such as an SLR camera. However, MTF testing procedures may be applied to virtually any camera or imaging system. As examples, MTF testing procedures may be used to certify web cameras, mobile phone cameras, tablet computer cameras, optical scanners, etc. for various telecommunications applications.

Environment 100 includes a test target 104 in the form of a wall that includes a repeating pattern of skewed rectangles (e.g., skewed rectangle 106). In this example, each of the rectangles is white, and the background is a dark grey color. Test target 104 is not intended to be limiting. In other examples, other test targets with different properties (e.g., patterns, colors, and/or sizes) may be used.

Figure 2:
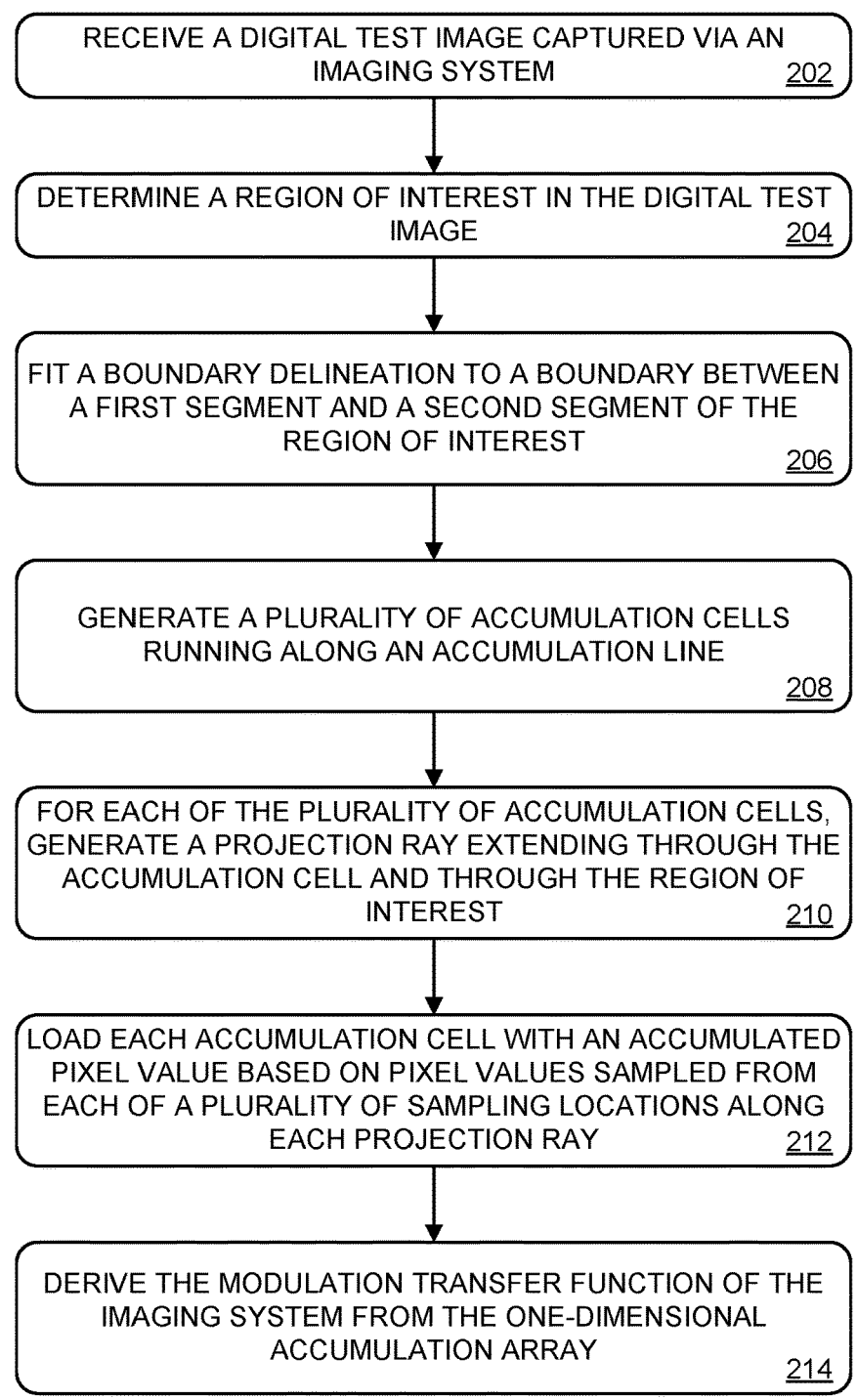
FIG. 2 is a flowchart of an example MTF testing method.

FIG. 2 is a flowchart of an example method 200 of MTF and/or SFR testing. In some examples, method 200 may be implemented on an MTF-testing computer system. For example, one or more steps of method 200 may be performed by an image processor of a modulation transfer function testing computing system. Such a computing system may be implemented as a suitable desktop computer, laptop computer, server, portable computing device (e.g., smartphone, tablet), wearable computing device, augmented/virtual reality device, etc. In some cases, one or more steps of method 200 may be performed by computing system 1100 described below with respect to FIG. 11.

Figure 3:
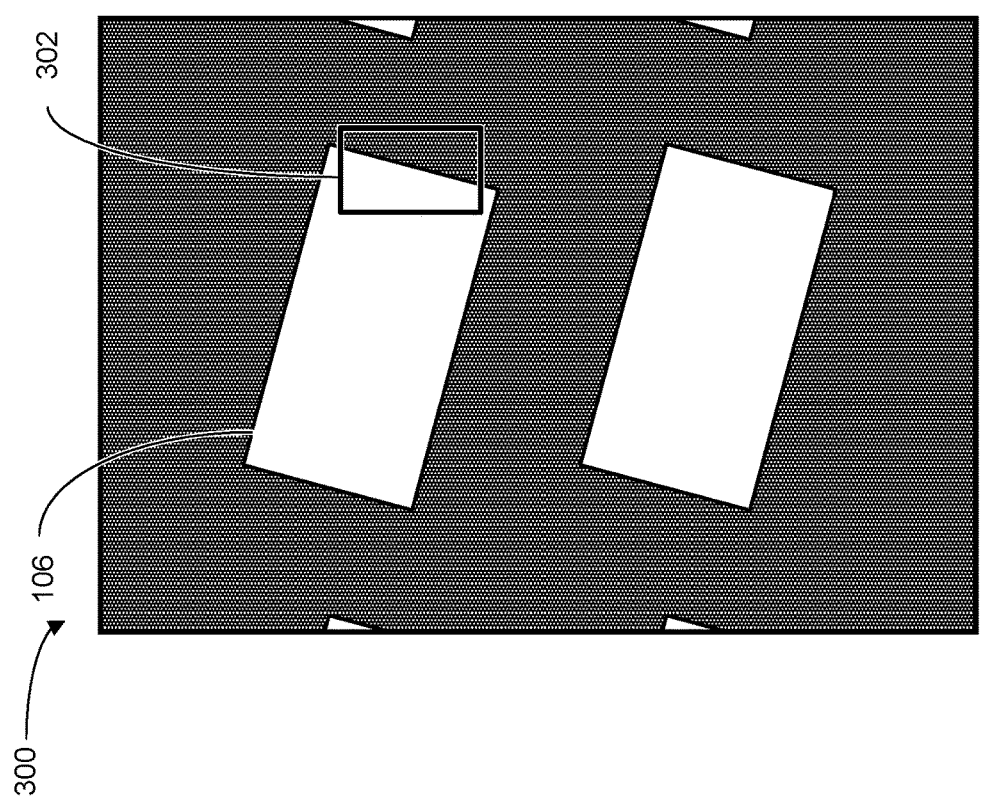
FIG. 3 shows a region of interest of an example digital test image.

At 202, method 200 includes receiving a digital test image captured via an imaging system. Using FIG. 1 as an example, imaging system 102 can be used to take a digital photograph of test target 104. FIG. 3 shows an example digital test image 300 taken by imaging system 102 of test target 104. Digital test image 300 includes a plurality of pixels, which may be defined by one or more color channel/luminance values. It will be understood that virtually any imaging system may be used to take a digital photograph or otherwise digitally capture any suitable test image.

In some cases, the imaging system used to take the digital test image may be a component of the computing system that performs MTF testing. In other cases, the imaging system and MTF-testing computing system may be separate devices. In any case, the computing system may receive the digital test image via an input interface, which may facilitate transmission of the digital test image via different components of the same computing system, between different devices linked via a suitable wired/wireless connection, over a suitable computer network such as the Internet, etc.

Returning briefly to FIG. 2, at 204, method 200 includes determining a region of interest (ROI) in the digital test image. The MTF can be determined for various portions of a camera's field of view (FOV) by testing different ROI in a test image. The MTF testing described herein may be done on one or more ROI in an image. When two or more ROI are tested, the MTF testing for the various regions may be tested in serial one after the other and/or in parallel. An ROI may be manually identified by a human test administrator, or an ROI may be automatically determined based on one or more criteria. An example automatic determination incudes testing a fixed rectangle of pixels in a digital image (e.g., the rectangle bound by pixel pairs [0,0] and [50,100]; and/or the rectangle bound by pixel pairs [0,100] and [50,100]). Another example automatic determination includes using a feature detector to find an edge having threshold contrast within a candidate region of the test image and selecting an ROI that includes the identified edge. In general, the MTF testing may be performed on any ROI, regardless of how the ROI is determined.

Returning briefly to FIG. 3, digital test image 300 includes a region of interest 302 identified as described above. ROI 302 includes a discrete number of pixels, and each pixel will typically include one or more integer values defining the color/brightness for the pixel (e.g., a value ranging from 0-255 for each of a red, green, and blue color channel).

In some examples, after determining the ROI, the computing system may optionally linearize pixel data of the ROI. As one nonlimiting example, the pixel data may be linearized by reversing an opto-electronic conversion function (OECF) applied when the digital test image was taken. Applying an OECF is sometimes known as gamma compression, while its inverse is known as gamma expansion. In general, linearization may result in a 2D pixel matrix that includes, for each pixel, a value (e.g., a floating point value) indicating a luminance level for that pixel of the ROI. As one example, a floating point value of 0 may be used for a minimum luminance, and a floating point value of 1 may be used for a maximum luminance, in which case all intermediate luminance values will be between 0 and 1. In another example, such values may range between 0 and 10, 0 and 255, etc.

After determining the ROI, the computing system may additionally or alternatively calculate a weighted sum of two or more color channels of each pixel. For example, pixels of an ROI may include a plurality of color channels (e.g., red, green, blue). When two or more channels are present, the luminance values may be calculated as the weighted average of one or more channels, and the MTF may be calculated for the averaged values. Alternatively, an MTF may be calculated for each color channel separately, in which case averaging is not necessary and subsequent steps of method 200 may be repeated for each color channel. In some implementations, an ROI may include a single channel (e.g., a monochrome channel), thus obviating the need for averaging and/or separate calculations.

Figure 4:
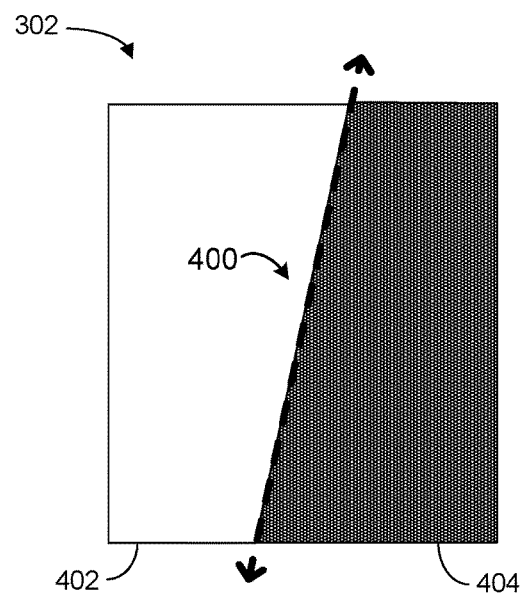
FIG. 4 shows fitting of a boundary delineation in the region of interest from FIG. 3.

Returning to FIG. 2, at 206, method 200 includes fitting a boundary delineation to a boundary between a first segment and a second segment of the region of interest. The first and second segments may be, for example, light and dark segments. This is schematically shown in FIG. 4, which shows a close-in view of ROI 302. A boundary delineation 400 has been fitted to a boundary between a first segment 402 of the ROI (i.e., a light segment) and a second segment 404 of the ROI (i.e., a dark segment). In some cases, the boundary delineation may be a straight line, while in other cases it may be curved, or assume any other suitable geometry.

In some implementations, the first segment and the second segment of the region of interest are identified using the Ridler-Calvard algorithm. The Ridler-Calvard algorithm advantageously is orientation agnostic and capable of finding non-vertical edges. However, other segmenting algorithms may be used in addition or as an alternative to the Ridler-Calvard algorithm.

In some implementations, fitting of the boundary delineation is performed using a total least squares algorithm. Total least squares advantageously takes the orientation of the edge of the skewed rectangle (i.e., the boundary to which the boundary delineation is fitted) into account. However, other line fitting approaches may be used.

Figure 5:
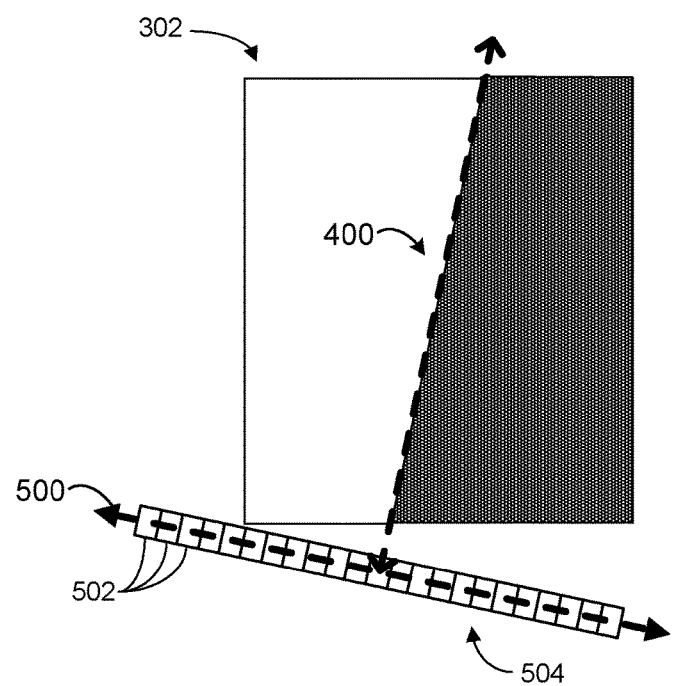
FIG. 5 shows an accumulation line with accumulation cells running along the accumulation line comprising a one-dimensional accumulation array.

Returning to FIG. 2, at 208, method 200 includes generating a plurality of accumulation cells running along an accumulation line. In some cases, the accumulation line may be perpendicular to the boundary delineation. The plurality of accumulation cells may collectively comprise a one-dimensional accumulation array, which may then be said to be "perpendicular" to the boundary delineation. In other implementations, the 1D accumulation array may be aligned with a coordinate axis of the ROI 300 or have another orientation. A one-dimensional accumulation array is illustrated in FIG. 5, which shows an accumulation line 500 perpendicular to boundary delineation 400 of ROI 302. A plurality of accumulation cells 502 are shown running along accumulation line 500, the accumulation cells collectively comprising a one-dimensional accumulation array 504.

In one example implementation, the 1D accumulation array is oversampled relative to a pixel resolution of the digital test image. In other words, the spatial width represented by each cell of the 1D accumulation array may be smaller than the spatial width of each pixel from ROI 302, thus allowing at least some pixels from ROI 302 to contribute to the loading of more than one cell of the 1D accumulation array. In one example implementation, the 1D accumulation array may be oversampled relative to the digital test image by a factor of 4, although smaller or larger oversampling factors may be used. In some implementations, no oversampling or even undersampling may be used.

Figure 6:
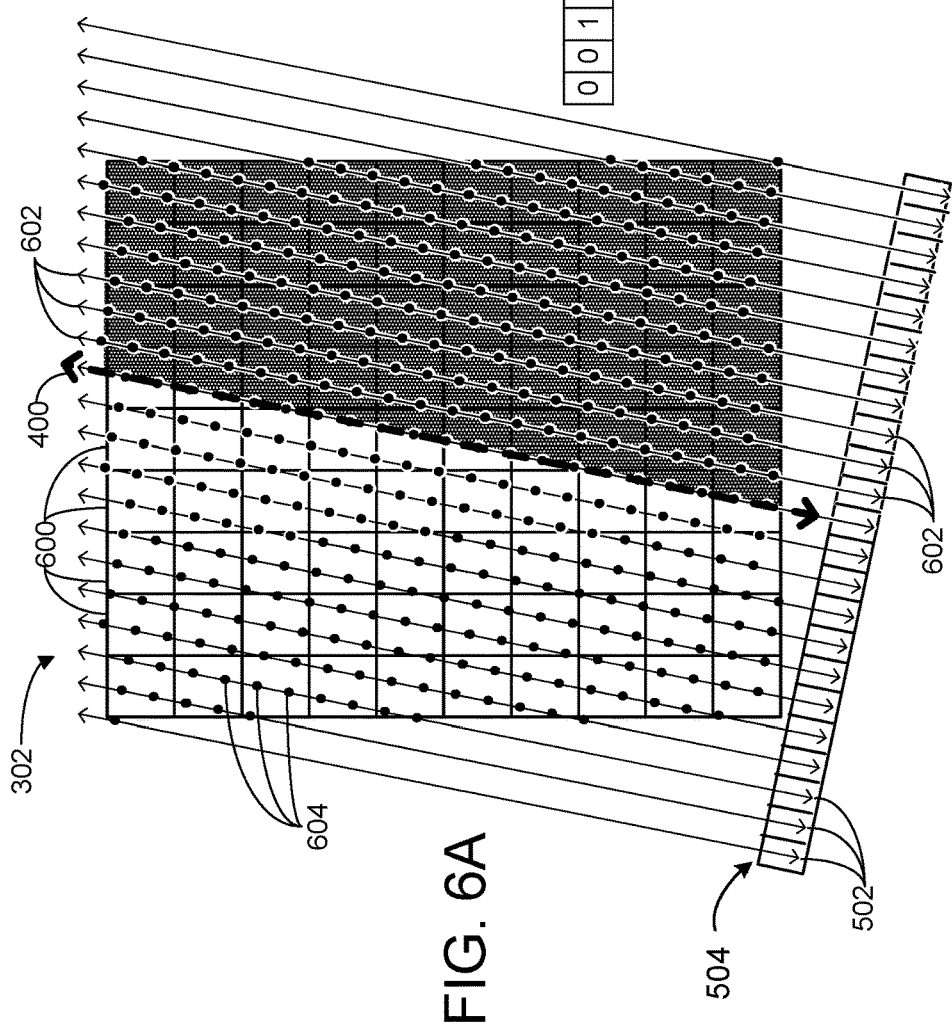
FIGS. 6A and 6B show loading of the one-dimensional accumulation array of FIG. 5 with accumulated pixel values sampled from the region of interest.

Turning again to FIG. 2, at 210, method 200 includes, for each of the plurality of accumulation cells, generating a projection ray extending through the accumulation cell and through the region of interest. This is illustrated in FIG. 6A, which again shows ROI 302. In FIG. 6A, a grid of pixels 600 is overlaid on ROI 302. It will be understood that the pixels 600 shown in FIG. 6A are oversized relative to real pixels, such that the boundary between the light and dark segments of the ROI appears continuous and does not have the "stepwise" appearance that would occur if ROI 302 was zoomed-in to the level of real pixels. This is done for the sake of visual clarity and consistency with how ROI 302 is shown in other figures.

FIG. 6A also shows a plurality of projection rays 602 extending through each of the accumulation cells 502 of the one-dimensional accumulation array 504, and also extending through ROI 302. In some cases, each of the projection rays is parallel to the boundary delineation, as is pictured in FIG. 6A. However, in other cases, projection rays may have any suitable orientation relative to the ROI.

Returning briefly to FIG. 2, at 212, method 200 includes loading each accumulation cell with an accumulated pixel value, the accumulated pixel value being based on pixel values sampled from each of a plurality of sampling locations equally-spaced along the projection ray. This may be characterized as "reverse projection," as discussed above. In other words, reverse projection is performed by iterating through each accumulation cell in the 1D accumulation array. Each accumulation cell is loaded with an accumulated pixel value that is based on a plurality of pixel values sampled along a projection ray that is parallel to the boundary delineation and that intersects (e.g., bisects) the accumulation cell. The sampling along each projection ray may have any desired spacing. In some implementations, the sampling spacing is equal to the cell width of the 1D accumulation array, although this is not required.

This process is also illustrated in FIG. 6A, in which each of the projection rays 602 are shown as having one or more equally-spaced sampling locations 604, represented as black circles. FIG. 6A, as well as the other figures, is merely a visual representation and is not intended to be literally accurate. In practice, pixels 600 of ROI 302 may be saved as a 2D matrix of floating point values.

As discussed above, the distance between neighboring projection rays may be increased or decreased by changing the amount of oversampling of 1D accumulation array 502, and the distance between neighboring sampling locations along a given projection ray may be changed by changing the sampling spacing. Ray-to-ray spacing and spacing of sampling locations along a given ray are not necessarily correlated. Spacing can be different along one axis compared to another axis. Alternatively, spacing can be set to be equal in both directions.

In some implementations, the pixel value sampled at each of the plurality of sampling locations may be a weighted interpolation of pixel values of one or more pixels proximate to the sampling location. The image-space position of each sampling location 604 may be defined by floating point coordinates in the image-space of ROI 302. However, the tested image is pixelated and thus is only defined with integer coordinates. The underlying value at each sampling location may be interpolated such that neighboring pixels affect the calculated value. For example, the pixel value sampled at a particular sampling location may be taken from the pixel in which the sampling location is located, as well as one or more neighboring pixels (e.g., four neighboring pixels or eight neighboring pixels). Different interpolation techniques use different numbers of neighboring pixels and different weighting techniques. As two examples, bilinear or bicubic interpolation may be used.

When interpolation is used as described above, each accumulation cell 502 is loaded with an accumulated pixel value that is based on the interpolated pixel values calculated for the sampling locations positioned along that cell's projection ray. This type of reverse projection can result in the single pixel value from a pixel in the ROI contributing to the values loaded into two or more accumulation cells. In the illustrated example, two or three accumulation rays pass through each pixel, and thus each pixel contributes to at least two accumulation cells. Depending on the type of interpolation that is used, each pixel may contribute to even more accumulation cells. This is in contrast to other MTF testing approaches that use "forward projection," where the single value from a pixel is loaded into only one accumulation cell, and then all of these single values that are loaded for a given accumulation cell are averaged together.

The accumulation cell 502 from which each projection ray 602 originates is loaded with an accumulated pixel value that is based on pixel values of ROI 302 sampled at each sampling location 604. In some cases, each accumulated pixel value may be an average of each of the pixel values sampled from each of the plurality of sampling locations equally spaced along the projection ray. This can be done as a weighted average, or a non-weighted average. In other cases, the accumulated pixel value may be calculated from the plurality of sampled pixel values in other suitable ways.

An example of a one-dimensional accumulation array that has been loaded as described above is shown in FIG. 6B, which shows 1D accumulation array 504 after it has been loaded with a set of accumulated pixel values 606. As illustrated, each accumulation cell is loaded with a single pixel intensity value ranging from 0 to 10. However, as indicated above, pixel values may take any form and have any suitable numerical value. Further, in some cases, each accumulation cell may hold more than one pixel value, for instance when each pixel in the ROI includes multiple color channels a different value can be loaded for each color channel.

Returning briefly to FIG. 2, at 214, method 200 includes deriving the MTF of the imaging system from the one-dimensional accumulation array. This may be done in a variety of suitable ways, though an example technique is provided below.

Figure 7:
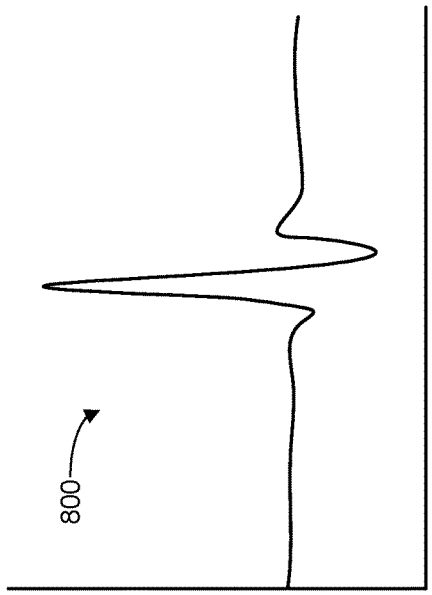
FIG. 7 shows an example plot of accumulated pixel intensity values from the one-dimensional accumulation array.

A plot of accumulated pixel values taken from the plurality of accumulation cells of the 1D accumulation array may be differentiated to give a differentiated plot of accumulated pixel values. FIG. 7 shows a plot 700 of accumulated pixel intensity values taken from an example 1D accumulation array. It will be understood that plot 700 is not intended to correspond to ROI 302 or 1D accumulation array 504, but rather is provided as an example of a hypothetical plot that may be produced when the above procedure is followed.

Figure 8:
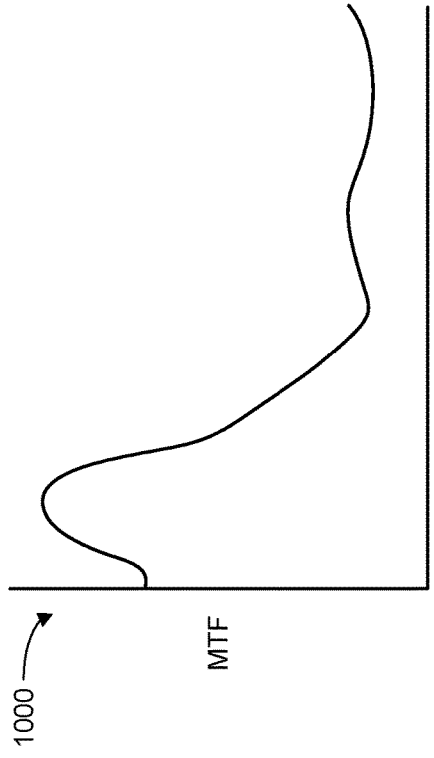
FIG. 8 shows an example derivative of the plot of accumulated pixel intensity values from FIG. 7.

FIG. 8 shows a differentiated plot 800 of accumulated pixel values. Plot 800 is not intended to be the exact 1$^{st}$ order derivative of plot 700, but rather is presented as an example of a hypothetical plot that may be produced after differentiation is performed. A plot of accumulated pixel values may be differentiated in a variety of suitable ways. As an example, the plot of accumulated pixel values may be differentiated by applying a finite impulse response filter via convolution. As another example, an infinite impulse response filter may be used.

A window filter optionally may be applied to the differentiated plot. As an example, a Hamming window, or similar window function, may be applied to the differentiated signal to reduce the effects of noise away from the segmented edge.

Figure 9:
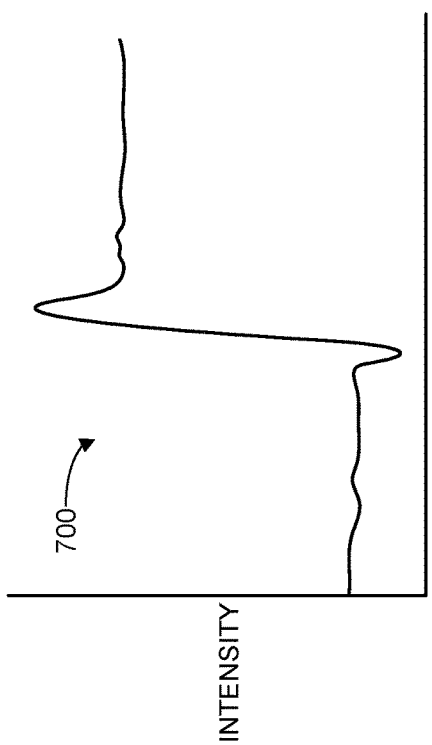
FIG. 9 shows a frequency-domain transformation of the plot from FIG. 8.
Figure 10:
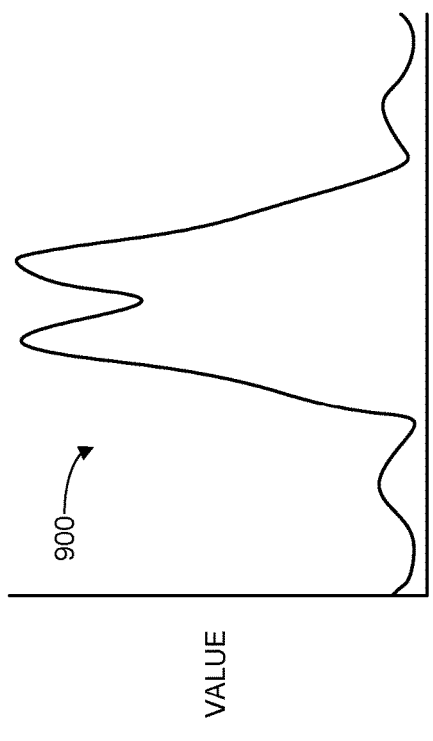
FIG. 10 shows a plot of the MTF of an imaging system derived from the plot of FIG. 9.

The differentiated plot may be transformed to a frequency-domain plot, and the modulation transfer function of the imaging system may be derived from the frequency-domain plot. As an example, the differentiated plot may be transformed using a discrete Fourier transform. FIG. 9 shows an example frequency-domain plot 900 transformed as discussed above. The magnitude of the transformed plot yields the spatial frequency response (SFR) which, assuming that the input is a step edge, is also the modulation transfer function (MTF). FIG. 10 shows a magnified section 1000 of the plot from FIG. 9, showing the MTF at relevant frequencies.

As with FIGS. 7 and 8, FIGS. 9 and 10 are not intended to be a precise representation of a frequency-domain transformation of plot 800, and are merely provided as examples of hypothetical plots that may be produced once frequency-domain transformation has occurred.

In some embodiments, the methods and processes described herein may be tied to a computing system of one or more computing devices. In particular, such methods and processes may be implemented as a computer-application program or service, an application-programming interface (API), a library, and/or other computer-program product.

Figure 11:
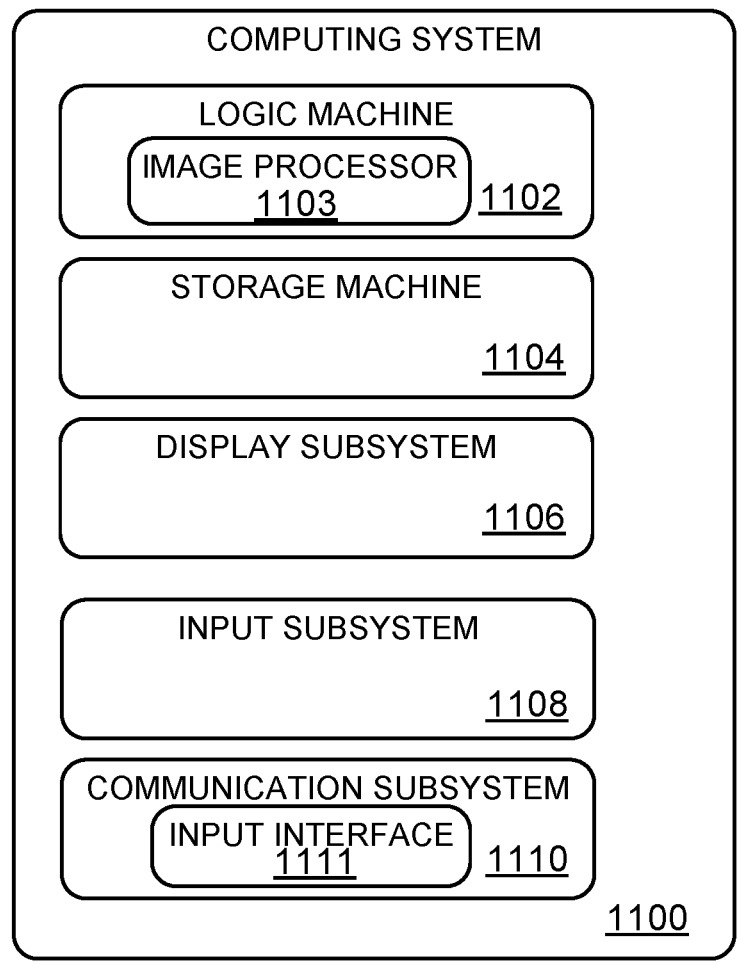
FIG. 11 schematically shows an example computing system.

FIG. 11 schematically shows a non-limiting embodiment of a computing system 1100 that can enact one or more of the methods and processes described above. Computing system 1100 is shown in simplified form. Computing system 1100 may take the form of one or more personal computers, server computers, tablet computers, home-entertainment computers, network computing devices, gaming devices, mobile computing devices, mobile communication devices (e.g., smart phone), and/or other computing devices. In particular, computing system 1100 may be implemented as a modulation transfer function testing computer system configured to test the MTF of an imaging system as described above.

Computing system 1100 includes a logic machine 1102 and a storage machine 1104. Computing system 1100 may optionally include a display subsystem 1106, input subsystem 1108, communication subsystem 1110, and/or other components not shown in FIG. 11.

Logic machine 1102 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. For example, the logic machine may include an image processor 1103 configured to perform one or more of the MTF testing steps described above. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 1104 includes one or more physical devices configured to hold instructions executable by the logic machine to implement the methods and processes described herein. When such methods and processes are implemented, the state of storage machine 1104 may be transformed—e.g., to hold different data.

Storage machine 1104 may include removable and/or built-in devices. Storage machine 1104 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 1104 may include volatile, nonvolatile, dynamic, static, read/write, read-only, random-access, sequential-access, location-addressable, file-addressable, and/or content-addressable devices.

It will be appreciated that storage machine 1104 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 1102 and storage machine 1104 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

When included, display subsystem 1106 may be used to present a visual representation of data held by storage machine 1104. This visual representation may take the form of a graphical user interface (GUI). As the herein described methods and processes change the data held by the storage machine, and thus transform the state of the storage machine, the state of display subsystem 1106 may likewise be transformed to visually represent changes in the underlying data. Display subsystem 1106 may include one or more display devices utilizing virtually any type of technology. Such display devices may be combined with logic machine 1102 and/or storage machine 1104 in a shared enclosure, or such display devices may be peripheral display devices.

When included, input subsystem 1108 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 1110 may be configured to communicatively couple computing system 1100 with one or more other computing devices. Communication subsystem 1110 may include wired and/or wireless communication devices compatible with one or more different communication protocols. For example, communication subsystem may enable computing system 1100 to receive a digital test image via an imaging system, which may be a component of the computing system, or a separate device. In some cases, the digital test image may be received via an input interface 1100. As non-limiting examples, the communication subsystem may be configured for communication via a wireless telephone network, or a wired or wireless local- or wide-area network. In some embodiments, the communication subsystem may allow computing system 1100 to send and/or receive messages to and/or from other devices via a network such as the Internet.

In an example, a computer-implemented method for computing a modulation transfer function or spatial frequency response of an imaging system comprises: on a computing device, receiving a digital test image captured via the imaging system, the digital test image having a plurality of pixels; determining a region of interest in the digital test image; fitting a boundary delineation to a boundary between a first segment and a second segment of the region of interest; generating a plurality of accumulation cells running along an accumulation line, the plurality of accumulation cells collectively comprising a one-dimensional accumulation array; loading each accumulation cell of the one-dimensional accumulation array with an accumulated pixel value, the accumulated pixel value being based on pixel values sampled from each of a plurality of sampling locations along a projection ray extending through the accumulation cell and through the region of interest; and deriving the modulation transfer function or the spatial frequency response of the imaging system from the one-dimensional accumulation array. In this example or any other example, the accumulation line is perpendicular to the boundary delineation. In this example or any other example, each projection ray extends parallel to the boundary delineation. In this example or any other example, the pixel value sampled at each of the plurality of sampling locations is a weighted interpolation of pixel values of one or more pixels proximate to the sampling location. In this example or any other example, each accumulated pixel value is an average of each of the pixel values sampled from each of the plurality of sampling locations, and each of the plurality of sampling locations are equally-spaced along the projection ray. In this example or any other example, the computer-implemented method further comprises, prior to fitting the boundary delineation, linearizing pixel data of the region of interest to reverse an opto-electronic conversion performed when the digital test image was captured. In this example or any other example, the first segment and the second segment of the region of interest are identified using a Ridler-Calvard algorithm. In this example or any other example, fitting of the boundary delineation is performed using a total least squares algorithm. In this example or any other example, the one-dimensional accumulation array is oversampled relative to the digital test image. In this example or any other example, the computer-implemented method further comprises, prior to deriving the modulation transfer function, differentiating a plot of accumulated pixel values taken from the plurality of accumulation cells of the one-dimensional accumulation array to give a differentiated plot of accumulated pixel values. In this example or any other example, the plot of accumulated pixel values is differentiated via convolution using a finite impulse response filter. In this example or any other example, the computer-implemented method further comprises applying a window function to the differentiated plot of accumulated pixel values. In this example or any other example, the computer-implemented method further comprises transforming the differentiated plot of accumulated pixel values to a frequency-domain plot, and deriving the modulation transfer function of the imaging system from the frequency-domain plot. In this example or any other example, the differentiated plot of accumulated pixel values is transformed using a discrete Fourier transform.

In an example, a modulation transfer function or spatial frequency response testing computer system comprises: an input interface; and an image processor configured to: via the input interface, receive a digital test image captured by an imaging system, the digital test image having a plurality of pixels; determine a region of interest in the digital test image; fit a boundary delineation to a boundary between a first segment and a second segment of the region of interest; generate a plurality of accumulation cells running along an accumulation line, the plurality of accumulation cells collectively comprising a one-dimensional accumulation array; for each of the plurality of accumulation cells, generate a projection ray extending through the accumulation cell and through the region of interest; load each accumulation cell of the one-dimensional accumulation array with an accumulated pixel value, the accumulated pixel value being based on pixel values sampled from each of a plurality of sampling locations along the projection ray; and derive the modulation transfer function or the spatial frequency response of the imaging system from the one-dimensional accumulation array. In this example or any other example, the pixel value sampled at each of the plurality of sampling locations is a weighted interpolation of pixel values of one or more pixels proximate to the sampling location. In this example or any other example, each accumulated pixel value is an average of each of the pixel values sampled from each of the plurality of sampling locations, and each of the plurality of sampling locations is equally-spaced along the projection ray. In this example or any other example, the one-dimensional accumulation array is oversampled relative to a pixel resolution of the digital test image. In this example or any other example, the first segment and the second segment of the region of interest are identified using a Ridler-Calvard algorithm.

In an example, a computer-implemented method for computing a modulation transfer function or a spatial frequency response of an imaging system comprises: on a computing device, generating a plurality of accumulation cells running along an accumulation line perpendicular to a boundary delineation, the boundary delineation dividing a first segment of a digital test image captured by the imaging system from a second segment of the digital test image, and the plurality of accumulation cells collectively comprising a one-dimensional accumulation array; for each of the plurality of accumulation cells, generating a projection ray extending through the accumulation cell and through the digital test image, each projection ray being parallel to the boundary delineation; loading each accumulation cell of the one-dimensional accumulation array with an accumulated pixel value, the accumulated pixel value being based on pixel values sampled from each of a plurality of sampling locations equally spaced along the projection ray; and deriving the modulation transfer function or the spatial frequency response of the imaging system from the one-dimensional accumulation array.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A computer-implemented method for computing a modulation transfer function or spatial frequency response of an imaging system, the method comprising:
    on a computing device, receiving a digital test image captured via the imaging system, the digital test image having a plurality of pixels;
    determining a region of interest in the digital test image;
    fitting a boundary delineation to a boundary between a light segment and a dark segment of the region of interest, the boundary delineation being non-parallel relative to an edge of the digital test image;
    generating a plurality of accumulation cells running along an accumulation line perpendicular to the boundary delineation, the plurality of accumulation cells collectively comprising a one-dimensional accumulation array;
    loading each accumulation cell of the one-dimensional accumulation array with an accumulated pixel value, the accumulated pixel value being based on pixel values sampled from each of a plurality of sampling locations along a projection ray extending through the accumulation cell and through the region of interest, such that each projection ray is parallel to the boundary delineation and non-parallel relative to the edge of the digital test image; and
    deriving the modulation transfer function or the spatial frequency response of the imaging system from the one-dimensional accumulation array.

2. The computer-implemented method of claim 1, where the pixel value sampled at each of the plurality of sampling locations is a weighted interpolation of pixel values of one or more pixels proximate to the sampling location.

3. The computer-implemented method of claim 1, where each accumulated pixel value is an average of each of the pixel values sampled from each of the plurality of sampling locations, and each of the plurality of sampling locations are equally-spaced along the projection ray.

4. The computer-implemented method of claim 1, further comprising, prior to fitting the boundary delineation, linearizing pixel data of the region of interest to reverse an opto-electronic conversion performed when the digital test image was captured.

5. The computer-implemented method of claim 1, where the light segment and the dark segment of the region of interest are identified using a Ridler-Calvard algorithm.

6. The computer-implemented method of claim 1, where fitting of the boundary delineation is performed using a total least squares algorithm.

7. The computer-implemented method of claim 1, where the one-dimensional accumulation array is oversampled relative to the digital test image.

8. The computer-implemented method of claim 1, further comprising, prior to deriving the modulation transfer function, differentiating a plot of accumulated pixel values taken from the plurality of accumulation cells of the one-dimensional accumulation array to give a differentiated plot of accumulated pixel values.

9. The computer-implemented method of claim 8, where the plot of accumulated pixel values is differentiated via convolution using a finite impulse response filter.

10. The computer-implemented method of claim 8, further comprising applying a window function to the differentiated plot of accumulated pixel values.

11. The computer-implemented method of claim 8, further comprising transforming the differentiated plot of accumulated pixel values to a frequency-domain plot, and deriving the modulation transfer function of the imaging system from the frequency-domain plot.

12. The computer-implemented method of claim 11, where the differentiated plot of accumulated pixel values is transformed using a discrete Fourier transform.

13. A modulation transfer function or spatial frequency response testing computer system, comprising:
    an input interface; and
    an image processor configured to:
        via the input interface, receive a digital test image captured by an imaging system, the digital test image having a plurality of pixels;
        determine a region of interest in the digital test image;
        fit a boundary delineation to a boundary between a light segment and a dark segment of the region of interest, the boundary delineation being non-parallel relative to an edge of the digital test image;
        generate a plurality of accumulation cells running along an accumulation line perpendicular to the boundary delineation, the plurality of accumulation cells collectively comprising a one-dimensional accumulation array;
        for each of the plurality of accumulation cells, generate a projection ray extending through the accumulation cell and through the region of interest, the projection ray extending parallel to the boundary delineation and extending non-parallel relative to the edge of the digital test image;
        load each accumulation cell of the one-dimensional accumulation array with an accumulated pixel value, the accumulated pixel value being based on pixel values sampled from each of a plurality of sampling locations along the projection ray; and
        derive the modulation transfer function or the spatial frequency response of the imaging system from the one-dimensional accumulation array.

14. The modulation transfer function or spatial frequency response testing computer system of claim 13, where the pixel value sampled at each of the plurality of sampling locations is a weighted interpolation of pixel values of one or more pixels proximate to the sampling location.

15. The modulation transfer function or spatial frequency response testing computer system of claim 13, where each accumulated pixel value is an average of each of the pixel values sampled from each of the plurality of sampling locations, and each of the plurality of sampling locations is equally-spaced along the projection ray.

16. The modulation transfer function or spatial frequency response testing computer system of claim 13, where the one-dimensional accumulation array is oversampled relative to a pixel resolution of the digital test image.

17. The modulation transfer function testing or spatial frequency response computer system of claim 13, where the light segment and the dark segment of the region of interest are identified using a Ridler-Calvard algorithm.

18. A computer-implemented method for computing a modulation transfer function or a spatial frequency response of an imaging system, the method comprising:
- on a computing device, generating a plurality of accumulation cells running along an accumulation line perpendicular to a boundary delineation, the boundary delineation being non-parallel relative to an edge of a digital test image and dividing a light segment of the digital test image captured by the imaging system from a dark segment of the digital test image, and the plurality of accumulation cells collectively comprising a one-dimensional accumulation array;
- for each of the plurality of accumulation cells, generating a projection ray extending through the accumulation cell and through the digital test image, each projection ray being parallel to the boundary delineation and non-parallel relative to the edge of the digital test image;
- loading each accumulation cell of the one-dimensional accumulation array with an accumulated pixel value, the accumulated pixel value being based on pixel values sampled from each of a plurality of sampling locations equally spaced along the projection ray; and
- deriving the modulation transfer function or the spatial frequency response of the imaging system from the one-dimensional accumulation array.

* * * * *